United States Patent

Happel et al.

[11] 4,266,727
[45] May 12, 1981

[54] DOUBLE-NEEDLE INJECTION-VALVE

[75] Inventors: Robert Happel, Waiblingen; Hans J. Haepp, Stuttgart, both of Fed. Rep. of Germany

[73] Assignee: Daimler-Benz Aktiengesellschaft, Stuttgart, Fed. Rep. of Germany

[21] Appl. No.: 971,001

[22] Filed: Dec. 19, 1978

[30] Foreign Application Priority Data

Dec. 24, 1977 [DE] Fed. Rep. of Germany ....... 2758057

[51] Int. Cl.³ .............................................. F02M 61/04
[52] U.S. Cl. .................................... 239/409; 239/410; 239/414; 239/416.4; 239/417.5; 239/533.12
[58] Field of Search .................................. 239/408–410, 239/412–415, 416.4, 416.5, 417.3, 417.5, 533.2–533.12; 123/32 JV

[56] References Cited

U.S. PATENT DOCUMENTS 3,830,433  8/1974  Miyake et al. ............... 239/533.12 X
3,958,538  5/1976  Hoshino ......................... 239/533.2 X

FOREIGN PATENT DOCUMENTS 1284687 12/1968 Fed. Rep. of Germany ........ 239/533.7
425614   6/1911  France ................................. 239/533.5
124642   4/1919  United Kingdom ................. 239/533.3
537825   7/1941  United Kingdom ................. 239/533.3

Primary Examiner—Andres Kashnikow
Attorney, Agent, or Firm—Craig and Antonelli

[57] ABSTRACT

An injection valve arrangement for a high-pressure injection of liquid fuel into a working chamber of an internal combustion engine with the arrangement including at least one valve needle which is urged by a spring force in a closing direction so that a pair of sealing cones associated with the valve needles are brought into engagement with a pair of separate valve seats. The valve needle is liftable in a direction opposite a flow direction effective in the injection process by hydraulic pressure of the fuel to be injected. Pressure chambers having a diameter larger than the respective valve seats are provided and communicate by way of appropriate ducts which merge to form a common flow cross-section. At least two separate line connectors are provided for receiving separate fuels and/or fuel components with the line connectors directing the fuels and/or fuel components to the respective pressure chambers.

13 Claims, 8 Drawing Figures

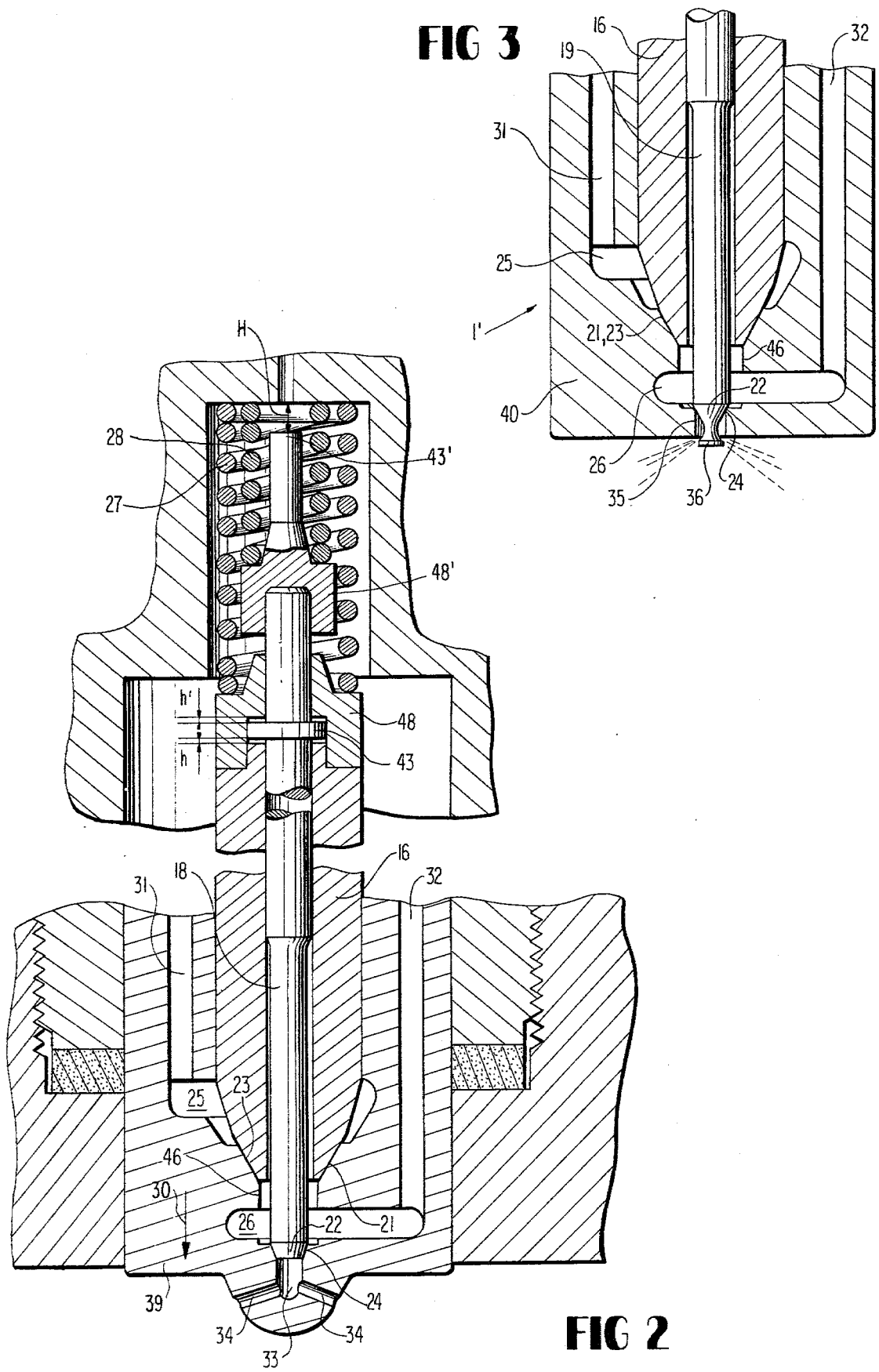

DOUBLE-NEEDLE INJECTION-VALVE

The present invention relates to a valve arrangement and, more particularly, to an injection valve arrangement for high-pressure injection of a fuel into a working chamber of an internal combustion engine which arrangement includes two needle valves disposed, preferably, concentrically within one another, with the needle valves being urged by a spring force in a closing direction so that associated sealing cones or the like are each forced onto a separate valve seat, the needle valves being liftable from their valve seats in a direction opposite a flow direction effective in the injection process by hydraulic pressure in the fuel to be injected, and a pressure chamber, with a larger diameter than the corresponding valve seat and surrounding the needle valves, being provided for each needle valve in a flow direction upstream of the valve seat, with the two pressure chambers communicating, by way of appropriate ducts disposed inside the injection valve, with a line connection for fuel on the injection valve and merging to form a flow cross-section which is common for the two needle valves when the needle valves are lifted.

A double-needle valve arrangement of the aforementioned type is proposed in, for example, German Pat. No. 1,284,687. In this proposed valve construction, pre-injection and main injection of diesel fuel into a working chamber of a diesel engine are achieved.

The aim underlying the present invention resides in providing a double-needle valve arrangement of the aforementioned type by which it is possible to realize a multi-fuel mixed operation of an injection valve.

According to advantageous features of the present invention, the injection valve is provided with two separate line connectors for fuel with each of the two pressure chambers being connected by way of separate ducts with only one of the line connectors.

By virtue of the provision of a double arrangement of line connections to the injection valve and separate ducts to the pressure chambers in accordance with the present invention, two different fuels may be injected simultaneously by a single injection valve. For this purpose, a double injection pump is provided with the pump including two different rows of feed or injection pistons for each row of working chambers in the internal combustion engine with the rows of the pistons being independently controllable.

During multi-fuel mixed operation, the volume ratio between one fuel component and the other must be variable as a function of the load of the engine. Consequently, an injection of a mixture of the two fuels through a normal injection valve is not possible. Often, the fuel components cannot be mixed with one another in a homogeneous fashion and with long-term stability due to the different physical characteristics and, after a relatively short period of time, the fuel components separate again. A prerequisite for successful use, for example, of certain fuel additives which are intended to improve combustion and hence the composition of the exhaust gases, is by way of an intimate mixture of the additives with the fuel. This is achieved in accordance with the present invention, by utilizing the injection valve in a common spray cross-section for the two fuel components as a result of the high turbulence.

In accordance with additional advantageous features of the present invention, both valve seats are disposed in a valve housing and the two needle valves are adapted to open or close simultaneously. To insure an approximate simultaneous lifting of the valves, stops and shoulders or the like are provided for limiting the relative travel of one of the needle valves relative to the other to a small fraction of the absolute needle valve travel. The small relative travel need only be slightly larger than the largest possible manufacturing tolerances for the valve seats with respect to their axial spacing.

According to the present invention, the two valve needles may be constructed as a single valve needle with two sealing cones or the like being arranged one behind the other with at least one of the valve seats, within the framework of the manufacturing tolerances of the axial positions of the sealing cones on the single valve needle, being disposed or supported in an axially movable and flexibly elastic manner in a valve seat body.

To provide for a communication between the two pressure chambers, at least one bore is provided which may be disposed in the valve seat body so that the two pressure chambers are connected when the valve needle is lifted.

In accordance with yet additional features of the present invention, the two valve needles, located concentrically with respect to one another, are adapted to execute a definite relative travel with respect to each other with an opening pressure of an outer valve needle being lower than that of an inner valve needle and the inner valve needle projecting out of the open end of the outer valve needle in a sealing manner. The projecting end of the inner valve needle may be further guided centrally through the valve seat of the outer valve needle and, in a sealing manner, through a bore in the valve seat body to a lower pressure chamber and the valve seat of the inner valve needle. The projecting end of the inner valve needle may be provided with a hollow bore and have a cross bore in a vicinity of an axial position of the end of the outer valve needle. The cross bore of the inner valve needle may be openable and closable by an end of the outer valve needle during the relative travel of the two valve needles in the manner of a spool valve. Moreover, when the valve needle has been lifted, bores in the projecting end of the inner valve needle may constitute the only flow connection between the two pressure chambers.

The injection valve of the present invention may be constructed as a multi-port valve or as a pintle-type valve and, as a pintle-type valve, may be constructed as a so called conversion nozzle valve with a constricted needle tip.

Furthermore, in the use of the injection valve of the present invention, different fuels or different fuel components may be supplied to the two pressure chambers. The fuels or fuel components may have different ignition performances and/or different soot-producting characteristics. Moreover, one fuel may be supplied to one of the pressure chambers and a liquid, insoluble and/or immiscible, environmentally safe exhaust-gas-improving fuel additive may be added to the other pressure chamber. It is also possible to supply, for example, a diesel fuel to the pressure chamber which opens first and a gasoline to the pressure chamber which opens last. Preferably, the injection valve is disposed so as to directly inject the fuel mixture or fuel components into a working chamber of the internal combustion engine.

Accordingly, it is an object of the present invention, to provide an injection valve arrangement for high-pressure injection of fuel into a working chamber of an internal combustion engine which avoids, by simple means, shortcomings and disadvantages encountered in the prior art.

Another object of the present invention resides in providing an injection valve arrangement for high-pressure injection of a fuel into a working chamber of an internal combustion engine which is capable of simultaneously supplying a mixture of two fuels and/or fuel components to the engine.

Yet another object of the present invention resides in providing an injection valve arrangement for high-pressure injection of a fuel into a working chamber of an internal combustion engine which insures a homogeneous mixing of the two fuels and/or fuel components during an injection process.

A further object of the present invention resides in providing a method of operating an internal combustion engine wherein different fuels and/or fuel components are supplied to two distinct pressure chambers of an injection valve.

A still further object of the present invention resides in providing a method of operating an internal combustion engine wherein fuels having different ignition performances and/or soot-producing characteristics are supplied to a working chamber of the engine by way of a single injection valve.

Another object of the present invention resides in providing an injection valve arrangement for high-pressure injection of a fuel into a working chamber of an internal combustion engine which is simple in construction and therefore inexpensive to manufacture.

A further object of the present invention resides in providing an injection valve arrangement for high-pressure injection of a fuel into a working chamber of an internal combustion engine which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein:

FIG. 2 is an enlarged cross-sectional view of the injection valve of FIG. 1;

FIG. 3 is a partial cross-sectional view of a further embodiment of an injection valve in accordance with the present invention constructed as a pintle-type valve;

Figure 1:
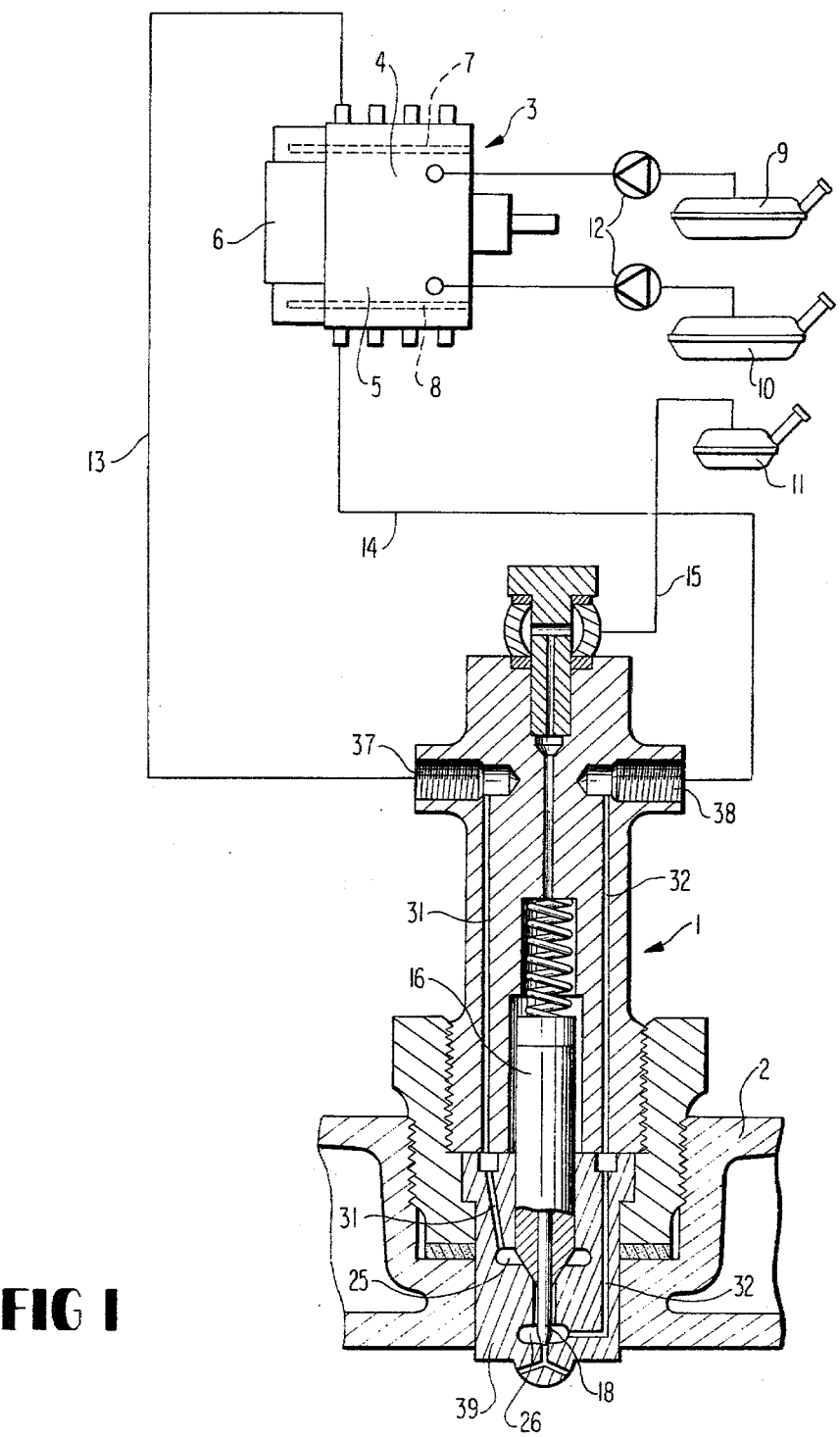
FIG. 1 is a partially-schematic cross-sectional view of a fuel supply system connected with an injection valve in accordance with a first embodiment of the present invention.

Referring now to the drawings wherein like reference numerals are used throughout the various views to designate like parts and, more particularly, to FIG. 1, according to this figure, an injection valve generally designated by the reference numeral 1 is mounted in a cylinder head 2 of an internal combustion engine (not shown) which is constructed for multi-fuel mixed operation. For this purpose, a double fuel injection pump generally designated by the reference numeral 3 is provided which includes a first piston row 4 and a second piston row 5 with a regulator 6 being mounted on the fuel injection pump 3 for selectively displacing or holding control rods 7, 8 for the respective piston rows 4, 5 in predetermined set positions as a function of the rpm and load of the internal combustion engine. Two fuel tanks 9, 10 as well as two fuel pumps 12 are provided which correspond to the multi-fuel mixed operation of the internal combustion engine. The fuel pumps 12 and tanks 9, 10 supply the double fuel injection pump 3 with different fuels and/or fuel components at a specified pre-feed pressure.

Two separate injection lines 13, 14 are provided for supplying two fuels and/or fuel components to the injection valve 1. The separate injection lines 13, 14 terminate at line connectors 37, 38 of the injection valve 1. Despite very close manufacturing tolerances, a leakage of fuel inside the injection valve on the low-pressure side of the valve needles can never truly be completely avoided; therefore, a mixture of two fuels and/or fuel components collects on the low-pressure side of the valve needles. An oil-leak connection is provided to carry away the mixture of the fuels from which oil-leak connection the fuel mixture may be guided into a collecting tank 11 for the fuel mixture by way of a return line 15.

In the construction of FIGS. 1 and 2, the injection valve 1 is constructed as a double-needle valve and includes two pressure chambers 25, 26 which, in a closed position of the injection valve 1, are separated from each other. One fuel or a component of the fuel is supplied to each of the two pressure chambers 25, 26 by way of separate pressure ducts or bores 31, 32.

Figure 4:
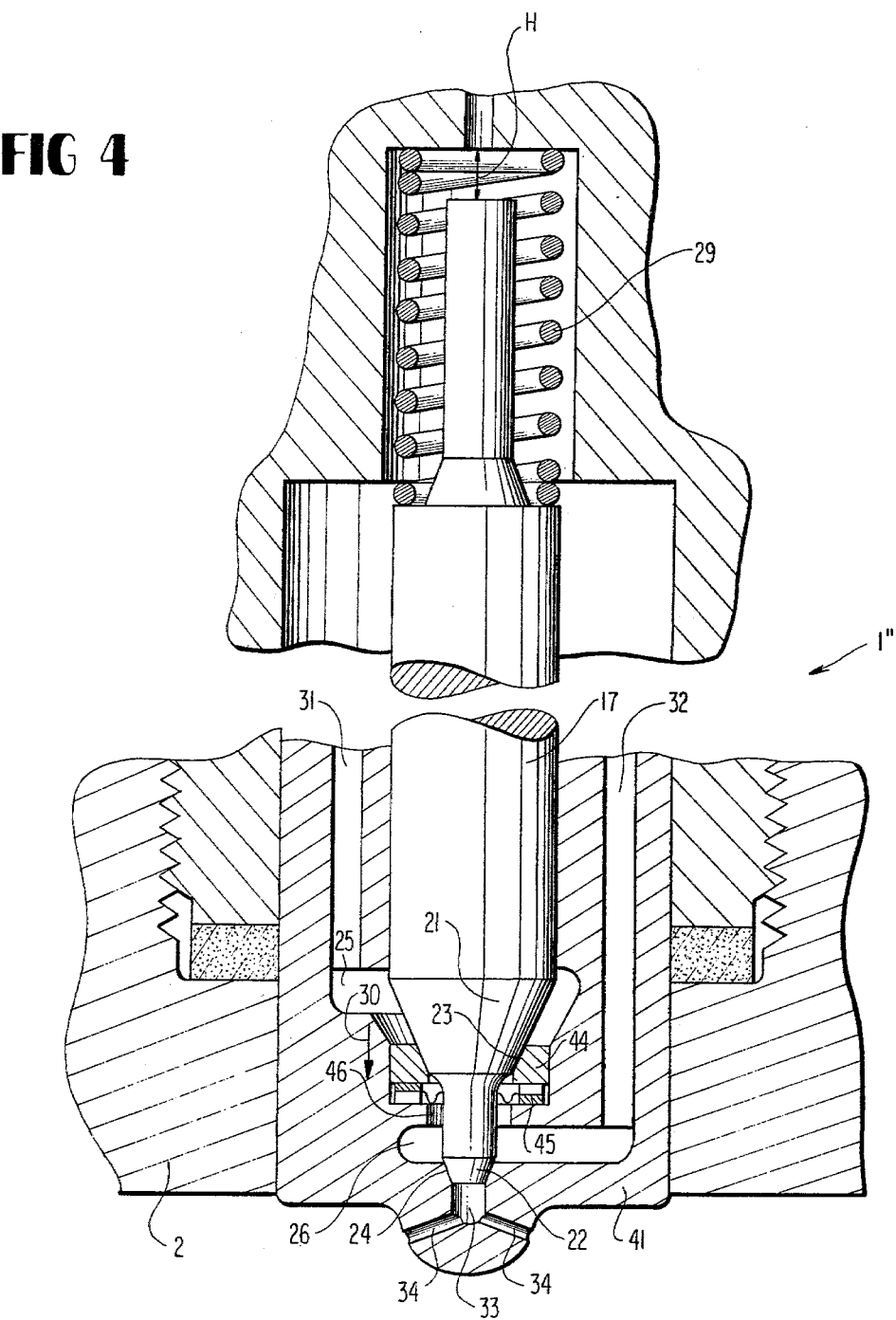
FIG. 4 is a cross-sectional view of a further embodiment of an injection valve in accordance with the present invention utilizing only a single valve needle and a flexible valve seat.
Figure 5:
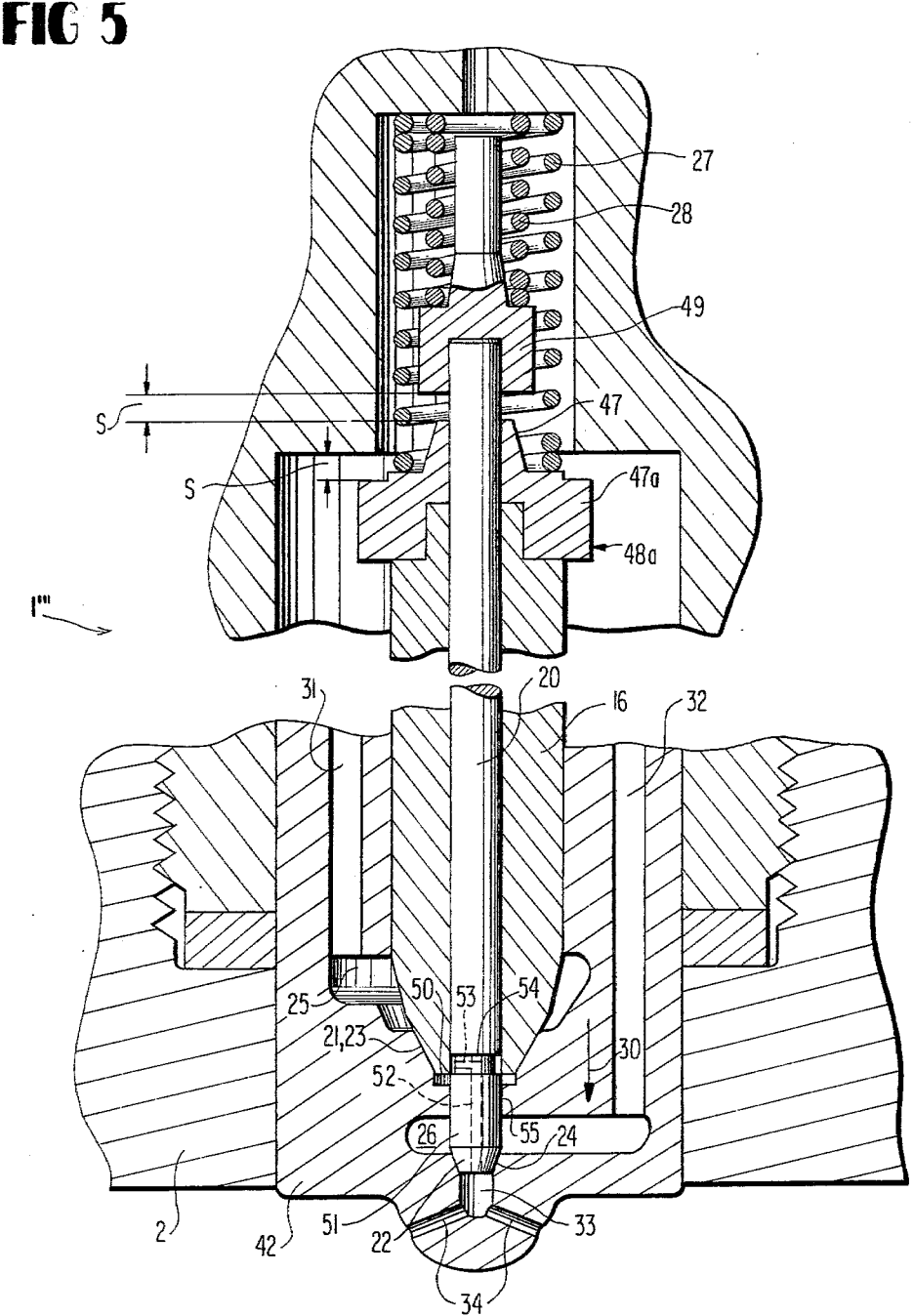
FIG. 5 is a cross-sectional view of yet another embodiment of an injection valve in accordance with the present invention which permits a timewise staggered injection of one fuel component with respect to another fuel component.

As shown in FIGS. 1 and 2, the double-needle valve is composed of an outer valve needle 16 and an inner valve needle 18 disposed concentrically within the outer valve needle 16. The outer valve needle 16 is provided at its lower end with a sealing cone 21 adapted to cooperate with a valve seat 23 formed integrally with the valve housing. The lower end of the inner valve needle 18, projecting with play out of the outer valve needle 16, is provided with a sealing cone 22 adapted to cooperate with a valve seat 24 of the lower pressure chamber 26. The injection valve 1 of FIGS. 1 and 2, as with the injection valve of FIGS. 4 and 5, is constructed as a multi-port valve with a blind bore or hole 33 being located below the lowermost valve seat 24 and a plurality of orifice nozzles 34 communicating with the blind bore 33. The blind bore 33 has a common flow cross-section for both pressure chambers 25, 26 wherein the two fuels and/or fuel components to be injected are mixed intimately with one another by the high turbulence.

The two valve needles 16, 18 are each pressed onto their corresponding valve seats 23, 24 by separate valve springs 27, 28. Hydraulic pressure of the fuel and/or fuel components in the pressure chambers 25, 26 enables the valve needles 16, 18 to be lifted off their respective valve seats 23, 24 against a force of the springs 27, 28 and against the flow direction designated by the arrow 30. When the valve needles 16, 18 are in a raised position, the two pressure chambers 25, 26 are connected by a bore 46 provided in the valve seat body 39.

The injection valves illustrated in FIGS. 1-4 are constructed for a simultaneous lifting and closing of the valve needles 16, 18. However, since the valve needles 16, 18 must close in a leak-tight manner against very high pressures, since the exact relative positions of the two valve seats 23, 24 are subject to certain variations as a result of differences in manufacturing, and since this relative position in a specific individual injection valve can also change in the course of time as a function of operation of the injection valve, it is sometimes difficult to insure a tight seal of both of the valve seats 23, 24, rigidly mounted in the valve seat body 39, with a common valve needle.

For this reason, in the constructions of FIGS. 1-4, two valve needles 16, 18 are provided and pressed against associated valve seats 23, 24 by separate springs 27, 28. To insure an approximately simultaneous lifting of the valve springs 27, 28, a stop flange 43, mounted on the inner valve needle 18, and a cap-shaped spring centering plate 48 pushed over the stop flange 43 for the outer valve needle 16 insures that only a small relative travel h or h' is possible in one direction of movement or the other. This small relative travel h or h' need only be slightly larger than the largest possible manufacturing tolerances for the two valve seats 23, 24 with respect to their axial spacing. The actual absolute needle travel H performed by the two valve needles 16, 18, jointly, is determined by a stop surface or flange 43' on a spring centering plate 48' of the inner valve needle 18 with the surface 43' being adapted to abut an inner upper side or surface of a chamber accommodating the springs 27, 28.

Briefly, the injection valve of FIGS. 1 and 2 operates as follows:

Cams (not shown) are provided for driving the first and second piston rows 4, 5 of the injection pump 3. The cams are constructed so that two opposite pistons in the respective piston rows 4, 5 begin to pump simultaneously. Likewise, the opening pressures of the two valve needles 16, 18 are made equal to one another so that the two valve needles 16, 18 are caused to be lifted at least approximately simultaneously. The stop flange 43 also insures a joint lifting of the two valve needles 16, 18 if one of the needles should stick. The fuels or the fuel mixtures delivered through the ducts 31, 32 enter the blind bore 33 with high turbulence and are mixed intimately thereat with one another prior to entering the working chamber of the engine. The injected amounts of the two individual fuels and/or fuel components may be independently controlled by suitable conventional control means. When injection of the two fuels and/or fuel components begins simultaneously, such can only be accomplished by one of the two fuels being injected for a longer period of time than the other. When no more fuel is being pumped into one of the two pressure chambers 25, 26 because delivery has ceased, the corresponding opening pressure will be maintained by the other fuel which continues to be fed so that both valve needles 16, 18 remain open. Even if one of the two fuels and/or fuel components is not to be injected at all in certain operating states of the internal combustion engine, the opening pressure of both valve needles 16, 18 is overcome jointly by the pressure of the one fuel or fuel components which continues to be injected. In this type of operation, the injection pressure is higher than normal.

It is advantageous to supply the fuel which is to be injected alone temporarily by way of the pressure chamber 25 of the outer valve needle 16 because the hydraulic pressure on the outer valve needle 16 alone necessarily moves both valve needles 16, 18. If the fuel for pre-injection is a fuel with high ignition performance such as, for example, diesel fuel, and the fuel for main injection is one with a short ignition lag such as, for example, gasoline, the construction of the injection valve 1 for direct injection produces relative gentle combustion.

In FIG. 3, the injection valve generally designated by the reference numeral 1' is provided with a modified valve seat body 40 as well as a valve needle 19 having a slightly different configuration from the valve needle 18 of the injection valve 1. However, both injection valves 1, 1' are in the form of a pintle-type valve with one pintle-type nozzle 35 in the valve seat body and one needle tip 36 in the inner valve needle 19. An annular gap formed between the pintle-type nozzle 35 and the needle tip 36 constitutes a common spray cross-section in which the two fuels can be mixed intimately with each other prior to entering the working chamber of the engine.

The needle tip 36 is markedly constricted and, in fact, is nearly mushroom-shaped thereby forming a so called conversion nozzle with the injection stream being converted to a widespread spray cone. Such construction results in a good distribution of the two fuels and/or fuel components in the working or combustion chamber of the engine even with low air turbulence and/or direct injection. In all other respects, the injection valve 1' of FIG. 3 corresponds to that shown in FIGS. 1 and 2.

As shown in FIG. 4, an injection valve generally designated by the reference numeral 1" is provided wherein, instead of two needles disposed concentrically, one within the other, only a single valve needle is provided having two sealing cones 21, 22 constructed in the same manner as the double needle valves discussed hereinabove. Since only one valve needle 17 is provided to accomplish a double sealing function, only a single valve spring 29 is likewise required.

To compensate for manufacturing tolerances, for which purpose the two needle valves were provided in the other embodiments, a movable valve seat ring 44 is inserted in a sealing manner in the valve seat body 41. The valve seat ring 44 is supported in a flexibly elastic manner by a spring washer 45 which has a very hard spring characteristic. The flexibly elastic mounting of the upper valve seat 23 means that both valve seats 23, 24 can be sealed in a leak-tight manner even against higher pressures by way of only the single valve needle 17.

Figure 8:
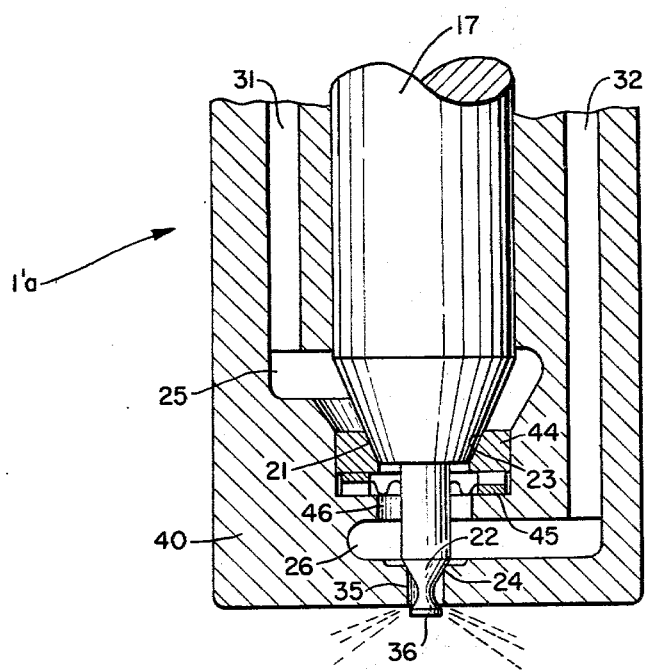
FIG. 8 is a partial cross-sectional view of a further embodiment of an injection valve in accordance with the present invention utilizing only a single valve needle in conjunction with a pintle valve construction and a flexible valve seat.

The elastic mounting of the valve seats 23, 24 in the valve housing constitutes, so to speak, a reversal of the elastic mounting of the sealing cone 22 relative to the outer valve needle 16. The injection valve 1" of FIG. 4 functions in the same manner as described hereinabove with respect to the injection valves of FIGS. 1-3. Thus, for example, as shown in FIG. 8, the pintle valve construction of FIG. 3 may be utilized with the movable valve seat ring of 44 supported in a flexible elastic manner by a spring washer 45, as shown in FIG. 4.

Figure 6:
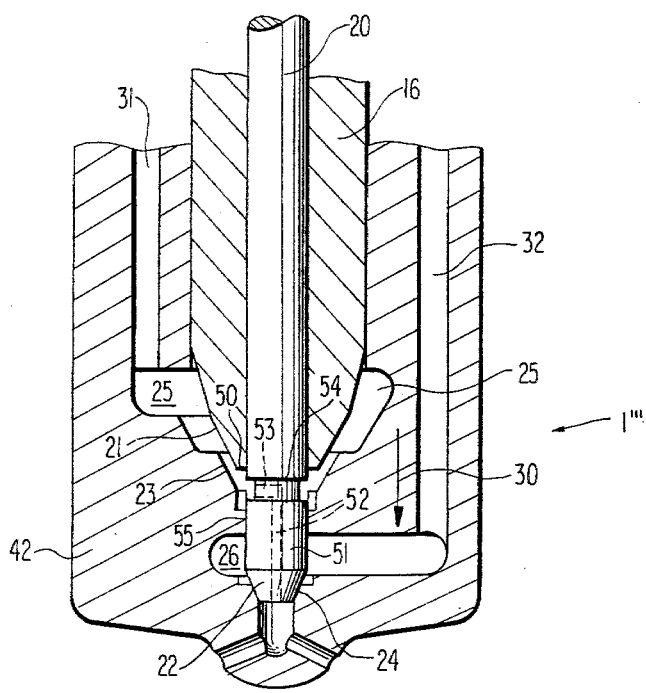
FIGS. 6 and 7 are cross-sectional views illustrating different operating states of the injection valve of FIG. 5.
Figure 7:
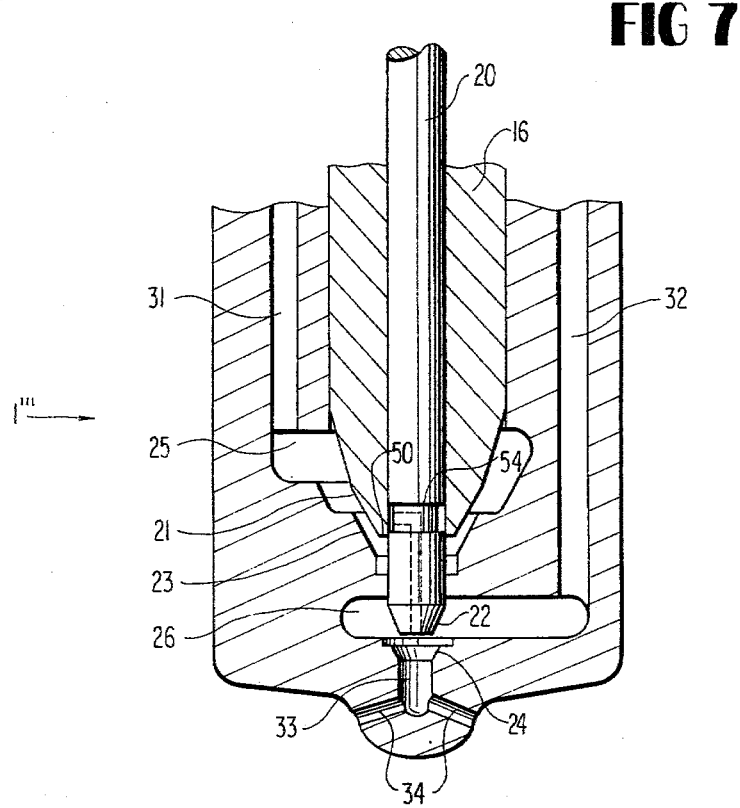

FIGS. 5-7 provide an example of an injection valve for multifuel mixed operation in which a different fuel and/or fuel components are adapted to be injected primarily sequentially. For this purpose, the two compression chambers 25, 26 of the injection valve generally designated by the reference numeral 1''' are separated from one another hydraulically. An inner valve needle 20 is guided in a sealing manner through a bore 55 provided in the valve seat body 42 as far as the lower valve seat 24. An end 51 of the inner valve needle 20 projecting beyond the end 50 of the outer valve needle 16 is likewise guided in a sealing manner in an interior of the outer valve needle 20, in contrast to the embodiments shown in FIGS. 1–3, wherein the lower end of the valve needle has a certain amount of play radially and therefore can compensate for a poor fit.

The projecting end 51 of the inner valve needle 20 in the injection valve 1''' has a hollow bore 52 which extends lengthwise and a cross bore 53 arranged in a vicinity of the end 50 of the outer valve needle 16. A circumferential groove 54 is also provided in a vicinity of the cross bore 53. The axial position in groove 54 is such that, when both valve needles 16, 20 are in a closed position, the groove 54 is completely covered by the outer valve needle 16.

In the construction of FIGS. 5–7, the injection valve 1''' is provided with a relatively large travel path S between the two valve needles 20, 16. Two stop shoulders 47, 47a are provided on a spring plate generally designated by the reference numeral 48a for the outer valve needle 16 with one stop 47a adapted to strike or come into abutting engagement with the valve housing after travelling distance S and the other stop 47 striking or engaging a spring plate 49 of the inner valve needle 20.

The valve springs 27, 28 in the injection valve 1''' are designed and constructed so that the outer valve needle 16 opens first. In cooperation with the corresponding double injection pump, for example, the pump 3, the outer valve needle 20 may also be caused to open first by virtue of the fact that delivery of the fuel to be fed to the compression chamber 25 is set to begin earlier than the start of delivery of the other fuel.

As shown most clearly in FIGS. 6 and 7, the operation of the injection valve 1''' is as follows:

After delivery of the fuel to the injection valve begins, the fuel is supplied by way of the duct 31 to the compression chamber 25. After the pressure in the chamber 25 exceeds the opening pressure for the outer valve needle 16, the valve needle 16 is raised so that its sealing cone 21 lifts off the valve seat 23 thereby exposing the groove 54. Fuel may then be sprayed by way of bores 52, 53, blind bore 55, and orifice nozzles 34 into the working chamber of the engine. As long as the outer valve needle 16 is still moving upward and has not yet covered the relative travel distance S, the inner valve needle 20 remains closed.

Assuming that a corresponding opening pressure has not yet developed in the lower pressure chamber 26, a situation which might be caused by the higher opening pressure of the inner valve needle 16 or a delayed start in delivery of the corresponding pump piston feeding the fuel to the lower pressure chamber 26, as long as the outer valve needle 16 has opened, and as long as the inner valve needle 20 has remained closed at the same time, as shown in FIG. 6, only one fuel or fuel component will enter into the working chamber of the engine. When the outer valve needle 16 has reached its maximum opening as determined by the engagement between the shoulder 47a and the corresponding edge of the valve housing, in which position stop shoulders 47 simultaneously strike spring plate 49, lifting the inner valve needle 20 off its valve seat 24, the valve needle 20 opens as well. It is assumed in this connection that the corresponding opening pressure has developed in the lower pressure chamber 26 in the meantime.

As apparent from the above description, during a certain transition phase both fuels and/or fuel components are simultaneously injected into the working chamber of the engine. As the inner valve needle 20 continues to open, the groove 54 is again gradually controlled by the outer valve needle 16 which remains in its highest lifted position or by the end 50 of the valve needle 16. This causes the feed of fuel by way of the duct 31 to be interrupted and only the fuel fed through the injection duct 32 enters the working chamber of the engine. A certain drop in pressure in the injection lines corresponding to the duct 31 or chamber 25 can be effected by an appropriate dimensioning of the play between the bore 55 and the valve needle end 51.

As the supply of fuel being fed by way of the duct 31 decreases, the outer valve needle 16 sinks or drops back onto its valve seat 23. The inner valve needle may then still be opened completely as a function of the injection time of the fuel supplied by way of the duct 32. After delivery of this fuel ceases, the inner valve needle 20 also returns to the valve seat 24 so as to result in a position such as illustrated in FIG. 5.

As can be appreciated, the successive injection of different fuels is especially advantageous in a mixed diesel fuel/gasoline form of operation of an engine. The corresponding internal combustion engine is then equipped as an air-compressing internal combustion engine with internal mixture formation which compresses the air to a point above the spontaneous ignition temperature of diesel fuel. By means of an injection valve 1''' such as illustrated in FIGS. 5–7, diesel fuel may first be supplied or injected by way of the lines or ducts 13, 31. Ignition in the working chamber of the internal combustion engine would then take place. Gasoline could then be injected by way of the lines or ducts 14 and 32 with a certain overlap in time with the gasoline then being ignited by the already burning diesel fuel. Since the gasoline is subject only to a slight delay in ignition because of the high temperature prevailing in the working chamber of the engine and because of the considerable tendency of gasoline toward evaporation, the gasoline injected through the duct 32 and pressure chamber 26 burns as fast as it is injected, thereby resulting in a relatively gentle combustion process.

Furthermore, the partial injection of diesel fuel, which ignites spontaneously, allows operation of the engine with a high excess of air. This fact, as well as the high compression, produces good complete combustion and hence good utilization of the fuel as well as increasing the quality of the exhaust gas as far as carbon monoxide content and hydrocarbon content are concerned. Since the internal combustion engine is operated primarily on gasoline at full load, better soot-producing characteristics of this fuel means that a soot emission from the corresponding internal combustion engine will be very low.

The use of the injection valves according to FIGS. 1–4 permits the soot-producing characteristic of diesel fuel to be improved, especially at full load by the fact that a liquid fuel additive may be mixed with the diesel fuel as a function of load and in a certain cycle as a fuel component at least in the upper and high load range by way of one of the two pressure chambers 25, 26. The additive may have a soot-reducing characteristic and be environmentally safe in and of itself. Advantageously, the fuel additive itself has fuel characteristics so that it could supply energy. The addition of a fuel additive of this kind with the aid of an injection valve in accordance with the present invention has the advantage that the mixing ratio can be varied as a function of load and also immiscible fuel additives could be readily utilized.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An injection valve for high-pressure injection of liquid fuel into a working chamber means of an internal combustion engine, the injection valve comprising a pair of axially spaced pressure chamber means for accommodating a quantity of liquid fuel, means for communicating said pressure chamber means with each other, and means for controlling the communication between the spaced pressure chamber means and between the injection valve and the working chamber means including first and second valve seat means, a valve needle means having a pair of valve sealing means adapted to cooperate with the respective valve seat means, and means for normally biasing said valve needle means in a closing direction such that the sealing means are forced into engagement with the respective valve seating means, the valve needle means being adapted to be displaced in an opening direction opposite a flow direction effective in an injection process by hydraulic pressure of the liquid fuel to be injected such that the pressure chamber means are in communication with each other, characterized in that separate line means are provided for connecting the injection valve with two separate sources of liquid fuel, separate means are provided for communicating each of the pressure chamber means with only one of the connecting line means, the valve needle means includes two valve needles disposed concentrically one within the other, each of the pressure chamber means having diameter which is larger than a diameter of the respective valve seat means and respectively surrounding the two valve needles, and in that pressure means are provided for causing the two valve needles to open and close simultaneously, such pressure means comprising the opening pressures experienced in the spaced pressure chamber means.

2. An injection valve for high-pressure injection of liquid fuel into a working chamber means of an internal combustion engine, the injection valve comprising a pair of axially spaced pressure chamber means for accommodating a quantity of liquid fuel, means for communicating said pressure chamber means with each other, and means for controlling the communication between the spaced pressure chamber means and between the injection valve and the working chamber means including first and second valve seat means, a valve needle means having a pair of valve sealing means adapted to cooperate with the respective valve seat means, and means for normally biasing said valve needle means in a closing direction such that the sealing means are forced into engagement with the respective valve seating means, the valve needle means being adapted to be displaced in an opening direction opposite a flow direction effective in an injection process by hydraulic pressure of the liquid fuel to be injected such that the pressure chamber means are in communication with each other, characterized in that separate line means are provided for connecting the injection valve within two separate sources of liquid fuel, separate means are provided for communicating each of the pressure chamber means with only one of the connecting line means, the valve needle means includes two valve needles disposed concentrically one within the other, each of the pressure chamber means having a diameter which is larger than a diameter of the respective valve seat means and respectively surrounding the two valve needles, and in that the construction of the two valve needles includes cooperable stop means and shoulder means provided on the respective valve needles, said stop means and shoulder means arranged such that a movement of one needle valve relative to the other needle valve is limited to a small fraction of an absolute travel of the valve needle means.

3. An injection valve for high-pressure injection of liquid fuel into a working chamber means of an internal combustion engine, the injection valve comprising a pair of axially spaced pressure chamber means for accommodating a quantity of liquid fuel, means for communicating said pressure chamber means with each other, and means for controlling the communication between the spaced pressure chamber means and between the injection valve and the working chamber means including first and second valve seat means, a valve needle means having a pair of valve sealing means adapted to cooperate with the respective valve seat means, and means for normally biasing said valve needle means in a closing direction such that the sealing means are forced into engagement with the respective valve seating means, the valve needle means being adapted to be displaced in an opening direction opposite a flow direction effective in an injection process by hydraulic pressure of the liquid fuel to be injected such that the pressure chamber means are in communication with each other, characterized in that separate line means are provided for connecting the injection valve with two separate sources of liquid fuel, that separate means are provided for communicating each of the pressure chamber means with only one of the connecting line means, a common flow cross-section is provided for communicating the injection valve with the working chamber means when the valve needle means is displaced in the opening direction, a valve body means is provided, both valve seat means being disposed in the valve body means, the valve needle means includes a single valve needle having the two valve sealing means disposed thereon one behind the other, and in that one of said valve seat means includes an axially movable valve seat ring means flexibly elastically supported in the valve body means for compensating for manufacturing tolerances of axial positions of the valve seat means on the single valve needle.

4. An injection valve for high-pressure injection of liquid fuel into a working chamber means of an internal combustion engine, the injection valve comprising a pair of axially spaced pressure chamber means for accommodating a quantity of liquid fuel, means for communicating said pressure chamber means with each other, and means for controlling the communication between the spaced pressure chamber means and between the injection valve and the working chamber means including first and second valve seat means, a valve needle means having a pair of valve sealing means adapted to cooperate with the respective valve seat means, and means for normally biasing said valve needle means in a closing direction such that the sealing means are forced into engagement with the respective valve seating means, the valve needle means being adapted to be displaced in an opening direction opposite the flow direction effective in an injection process by hydraulic pressure of the liquid fuel to be injected such that the pressure chamber means are in communication with each other, characterized in that separate line means are provided for connecting the injection valve with two separate sources of liquid fuel, separate means are provided for communicating each of the pressure chamber means with only one of the connecting line means, the valve needle means includes two valve needles disposed concentrically with respect to one another and being mounted so as to execute a definite relative movement with respect to each other, said two valve needles forming an inner valve needle and an outer valve needle, the biasing means are constructed so that an opening pressure of the outer valve needle is less than an opening pressure of the inner valve needle, the inner valve needle includes an end portion projecting outwardly from an open end of the outer valve needle in a sealing manner, and in that the two pressure chamber means form an upper and lower pressure chamber means, a bore means being interposed between the upper and lower pressure chamber means for centrally guiding in a sealing manner the outwardly projecting end portion of the inner valve needle through one of the valve seat means to the lower pressure chamber means and the other valve seat means associated with the inner valve needle.

5. An injection valve according to claim 1, characterized in that a common flow cross-section is provided for communicating the injection valve with the working chamber means when the valve needle means is displaced in the opening direction.

6. An injection valve according to claim 5, characterized in that a valve body means is provided and in that both valve seat means are disposed in the valve body means.

7. An injection valve according to claim 4, characterized in that the inner valve needle is provided with a further bore extending axially thereof and a cross bore communicating with said further bore and the upper pressure chamber means, the cross bore being disposed in a vicinity of an end of the outer valve needle.

8. An injection valve according to claim 7, characterized in that the cross bore is arranged such that an opening and closing thereof is effected during the relative movement of the inner and outer valve needle in the manner of a spool valve.

9. An injection valve according to claim 8, characterized in that one of the valve seat means, the cross bore, and said further bore constitutes the only flow connection between the two pressure chamber means when the outer valve needle has been displaced to an open position.

10. An injection valve according to one of claims 6, 1, 2 or 3, characterized in that said means for communicating said pressure chamber means includes a bore means disposed in the injection valve for communicating the two pressure chamber means with each other when the valve needle means is displaced to an open position.

11. An injection valve according to one of claims 6, 1, 3, 7 or 9 characterized in that a plurality of nozzle means are provided for injecting the fuel into the working chamber means of the engine.

12. An injection valve according to one of claims 6, 1, or 3, characterized in that the injection valve is constructed as a pintle-type valve.

13. An injection valve according to claim 12, characterized in that the valve needle means terminates in a needle tip adapted to cooperate with a pintle-type nozzle means for injecting the fuel into the working chamber means.

* * * * *